(12) United States Patent
Juzak et al.

(10) Patent No.: US 11,378,113 B2
(45) Date of Patent: Jul. 5, 2022

(54) FASTENING UNIT

(71) Applicant: J. van Walraven Holding B.V., Mijdrecht (NL)

(72) Inventors: Marek Juzak, Mijdrecht (NL); Frank Nijdam, Zeewolde (NL)

(73) Assignee: J. VAN WALRAVEN HOLDING B.V, Mijdrecht (NL)

( * ) Notice: Subject to any disclaimer, the term of this patent is extended or adjusted under 35 U.S.C. 154(b) by 313 days.

(21) Appl. No.: 16/651,592

(22) PCT Filed: Oct. 15, 2018

(86) PCT No.: PCT/NL2018/050676
§ 371 (c)(1),
(2) Date: Mar. 27, 2020

(87) PCT Pub. No.: WO2019/078709
PCT Pub. Date: Apr. 25, 2019

(65) Prior Publication Data
US 2020/0256363 A1   Aug. 13, 2020

(30) Foreign Application Priority Data

Oct. 17, 2017   (NL) ..................................... 2019744

(51) Int. Cl.
*F16B 5/06* (2006.01)
*F16B 37/04* (2006.01)
*F16B 7/18* (2006.01)

(52) U.S. Cl.
CPC ............ *F16B 5/0621* (2013.01); *F16B 7/187* (2013.01); *F16B 37/046* (2013.01)

(58) Field of Classification Search
CPC ...... F16B 37/046; F16B 7/0473; F16B 7/187; F16B 5/0621; F16B 37/045
See application file for complete search history.

(56) References Cited

U.S. PATENT DOCUMENTS 5,655,865 A * 8/1997 Plank ........................ E04D 3/08
403/258
8,303,223 B2 * 11/2012 Rass ..................... F16B 37/045
248/58

(Continued)

FOREIGN PATENT DOCUMENTS

CH        597450 A5      4/1978
DE   102015118314 A1    6/2016

(Continued)

OTHER PUBLICATIONS

International Search Report and Written Opinion for PCT/NL2018/050676 dated Jan. 9, 2019 (12 pages).

*Primary Examiner* — Matthew R McMahon
(74) *Attorney, Agent, or Firm* — Tutunjian & Bitetto, P.C.

(57) ABSTRACT

A fastening unit for fastening an object to a profile element includes a first layer of vibration isolating material arranged on an underside of a washer element and a second layer of vibration isolating material arranged on an upper side of an oblong anchoring element. The oblong anchoring element and the second layer of vibration isolating material each have a width that allows them, preferably in unity, to be aligned with a longitudinal slot of the profiled element inserted therein, and then turned to receive flanges of the profile element between the first layer of vibration isolating material and the second layer of vibration isolating material, so as to provide, at least in a fastened state of the fastening unit, a barrier for vibrations between the washer element and the flanges and between the oblong anchoring element and the flanges.

12 Claims, 3 Drawing Sheets

(56) References Cited

U.S. PATENT DOCUMENTS

| | | | | |
|---|---|---|---|---|
| 8,845,225 | B2* | 9/2014 | Schmidt | B61D 17/18 |
| | | | | 403/252 |
| 9,194,418 | B2* | 11/2015 | Parthibhan | F16B 37/046 |
| 2012/0308328 | A1* | 12/2012 | Ueno | F24S 25/636 |
| | | | | 411/134 |
| 2018/0266476 | A1* | 9/2018 | Linka | F16B 37/046 |

FOREIGN PATENT DOCUMENTS

| | | | | |
|---|---|---|---|---|
| DE | 102015108302 A1 * | 12/2016 | | F16B 37/045 |
| DE | 102017103770 A1 * | 8/2018 | | F16B 37/042 |
| DE | 202017006631 U1 * | 5/2019 | | |
| EP | 0687822 A2 | 12/1995 | | |
| WO | WO-0150069 A1 * | 7/2001 | | F24F 13/20 |
| WO | 2007008060 A1 | 1/2007 | | |

\* cited by examiner

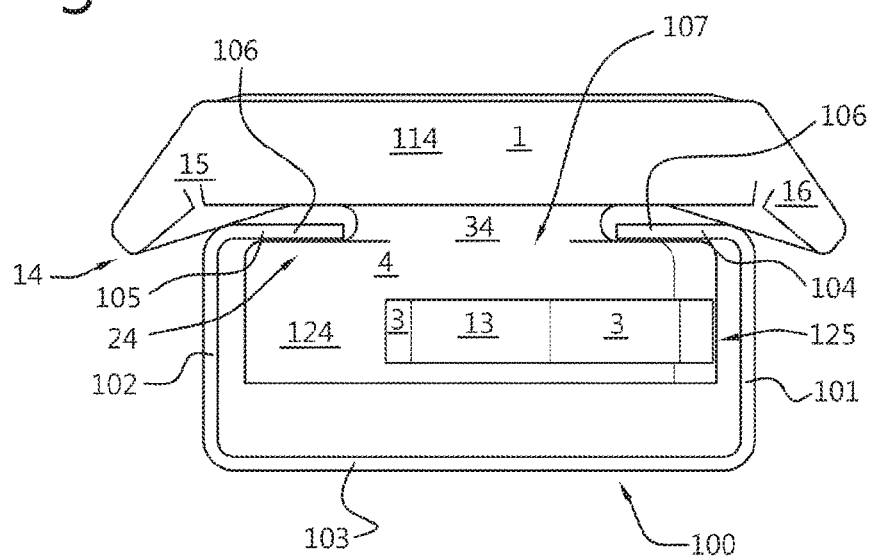

FASTENING UNIT

BACKGROUND

1. Technical Field

The present invention relates to a fastening unit for fastening an object to a profile element, the fastening unit comprising a washer element, adapted to be placed on an upper side of the profile element, an oblong anchoring element having a threaded bore, the oblong anchoring element being spaced apart from the washer element and adapted to be placed inside the profile element, beyond the flanges thereof, and a support element, interconnecting the washer element and the oblong anchoring element.

2. Description of Related Art

WO2007/008060 in the name of the same applicant discloses a fastening unit comprising an elongated metal anchoring member, a metal washer element, and a support. The support is connected to the washer element, and bears the anchoring element. The support comprises a head with one or more connecting members engaging the washer element, and also legs extending from the head in a direction away from the washer element to a bottom end of the corresponding leg situated below the anchoring member. The support below the anchoring member comprises one or more spring members, which are supported on the bottom ends of the legs and engage the anchoring member from underneath. In use, upon fastening the fastening unit to a profile element, the spring members resiliently support the anchoring member.

The fastening unit of WO2007/008060 comprises a metal washer element and a metal anchoring element, that each, in a fastened state of the fastening unit, directly engage the flanges of the profile element. This is in particular an effective solution in structures which have to withstand safely the influence of heat in case of a fire. The fastening unit will remain fastened to the profile element, and items secured to the profile element via the fastening unit, such as overhead pipes mounted to a ceiling, remain secure. Moreover, the metal on metal contact between the fastening unit and the rail prevent creep.

SUMMARY OF THE INVENTION

It is an object of the present invention to provide an alternative fastening unit.

The present invention provides a fastening unit according to the present application.

This fastening unit is in particular suitable for sanitary fittings and/or other fitting behind false walls. In such applications, it may be that the occurrence of a fire and the occurrence of creep are less relevant for the design of a fastening unit. In contrast, the occurrence of vibrations between the object secured to the profile element and the fastening unit may be more relevant for the design of the fastening unit. Fastening units for sanitary fittings and/or other fittings behind false walls are often prone to vibrations which may result in noise. For example, when a pipe is secured to the fastening unit, the running of water through said pipe, e.g. when turning on a shower, may vibrate said pipe, which may in turn cause an undesired amount of noise as the profile element may start to vibrate along with the pipe. By providing a support element that interconnects the washer element and the oblong anchoring element, that comprises a first layer of vibration isolating material arranged on an underside of the washer element and a second layer of vibration isolating material arranged on an upper side of the anchoring element, such that, at least in a fastened state of the fastening unit, a barrier for vibrations between the washer element and the flanges of the profile element and between the oblong anchoring element and the flanges of the profile element is provided, this problem may at least partially be solved, reducing the transmission of sound and other vibrations from the pipe to the fastening unit and/or the rail, reducing the noise level such vibrations cause.

The fastening unit comprises a support element, interconnecting the oblong anchoring element and the washer element. The support element comprises a first layer of vibration isolating material arranged on an underside of the washer element and a second layer of vibration isolating material arranged on an upper side of the anchoring element. Preferably, the respective layers of vibration isolating material cover the entire upper side of the anchoring element and the entire underside of the washer element.

The oblong anchoring element and the second layer of vibration isolating material each have a width that allows them, preferably in unity, to be aligned with the longitudinal slot of the profiled element, inserted therein, and then turned, e.g. over 90 degrees, to receive the flanges of the profile element between the first layer of vibration isolating material and the second layer of vibration isolating material. Subsequently, the second layer of vibration isolating material and the oblong anchoring element are forced towards the underside of the flanges by tensioning means, e.g. a threaded rod and a nut to fasten the fastening unit to the profile element.

In a fastened state of the fastening unit, the layers of vibration isolating material provide a barrier for vibrations between the washer element and the flanges of the profile element and between the oblong anchoring element and the flanges of the profile element.

While fastening the fastening unit with respect to the profile element, the layers of vibration isolating material may further serve as resilient layers, that ensure a better clamping of the flanges between the washer element and the oblong anchoring element.

The fastening unit according to the invention is mainly suited for use behind a false wall, e.g. when installing water pipes running towards a mixing valve of a shower and/or a bath. As stated before, known fastening units comprise a washer element and an anchoring element, that each, in a fastened state of the fastening unit, directly engage the flanges of the profile element for reasons of fire safety. Hence, the fastening unit of the invention may not be suited to install all vertically arranged pipes to a profile element, for safety reasons during a fire, but is instead suited for the installation of relatively small-diameter pipes, arranged vertically in for example bathrooms or other sanitary applications. The fastening unit may further be suited to install horizontally arranged pipes, and pipes arranged at a relatively small inclination with respect to the horizontal orientation, i.e. with an inclination of up to about an absolute value of 10 degrees.

Preferably, the washer element and the oblong anchoring element are made of a stiff material, i.e. of a material that is stiffer than the vibration isolation material. For example, the washer element and/or the oblong anchoring element can be made of a metal, or of a stiff plastic material.

In a possible embodiment, the vibration isolating material is an elastomeric material, e.g. a rubber, to optimally clamp the flanges in between the first layer of vibration isolating material and the second layer of vibration isolating material, as explained in the above while fastening the fastening unit, the elastomeric material may deform and grip around the flanges of the profile element.

In a possible embodiment, the support element comprises a central body portion connecting the first layer of vibration isolating material and the second layer of vibration isolating material, the central body portion being sized to fit through the longitudinal slot of the profile element. The central body portion may be made of a vibration isolating material, the central body portion and the layers of vibration isolating material e.g. being made in one piece. The central body portion may also be made of another material, to which the layers of vibration isolating material may be connected. In a fastened state, the central body portion may be arranged inside the longitudinal slot of the profile element, in between the flanges thereof.

In a possible embodiment, the support element comprises a lower portion that includes the second layer of vibration isolating material, said lower portion comprising a receiving pocket in which the oblong anchoring element is received. The lower portion may be defined as the portion of the support element that in a fastened state is arranged inside the profile element, beyond the flanges, while an upper side of the lower portion engages the flanges of the profile element. The lower portion may have a substantial thickness, e.g. 2 cm or more, with an internal receiving pocket for the oblong anchoring element. When the oblong anchoring element is received in the receiving pocket of the support element, it may be substantially surrounded by the lower portion of the support element. That is, the lower portion may be arranged above the oblong anchoring element and below the oblong anchoring element.

In a possible embodiment, the support element comprises an upper portion that includes the first layer of vibration isolating material, said upper portion comprising an inlay area for the washer element, the inlay area being recessed with respect to a rim of the upper portion. The upper portion may be defined as the portion of the support element that in a fastened state is arranged at the outer side of the profile element, on the upper side of the flanges, while an engagement side of the upper portion engages the flanges of the profile element. The upper portion may have a substantial thickness, with an inlay area for the washer element. A side edge of the washer element may be fully surrounded by the upper portion of the profile element, while the rim of the upper portion may extend beyond the washer element.

In a possible embodiment, the first layer of vibration isolating material and the second layer of vibration isolating material are sized such that in a fastened state they engage at least a part of the flanges of the profile element. The first layer of vibration isolating material engages the flanges at an outer side thereof, while the second layer of vibration isolating material engages the flanges at an inner side thereof. While engaging the flanges, the layers of vibration isolating material may clamp the flanges between them, in a fastened state of the fastening unit; fastening the fastening unit with respect to the profile element. In a fastened state, the layers of vibration isolating material may be deformed with respect to an unloaded state. The width of the second layer of vibration isolating material may be smaller than a width of the longitudinal slot, allowing the second layer of vibration isolating material to be inserted into the profile element, while a length of the second layer of vibration isolating material may be wider than the width of the longitudinal slot, providing a contact area between second layer of vibration isolating material and the flanges, and allowing the second layer of vibration isolating material to engage with the flanges of the profile element in a fastened state. The length of the second layer of vibration isolating material is preferably smaller than an inner width of the profile element, while the length of the first layer of vibration isolating material may be larger than an outer width of the profile element, providing a contact area between first layer of vibration isolating material and the flanges.

In a possible embodiment, the first layer of vibration isolating material is sized such that in a fastened state it engages an upper edge of the sidewalls of the profile element. The first layer of vibration isolating material may be longer than a width of the profile element, the first layer of vibration isolating material extending outwards with respect to the flanges, on an upper outer side thereof, and engaging the side walls of the profile element at the corner between the side walls and the flanges. The side walls of the profile element may be structurally stronger than the flanges, thereby ensuring a better fastening of the fastening unit when the first layer of vibration isolating material engages said sidewalls.

In a possible embodiment, the first layer of vibration isolating material, seen in a longitudinal direction thereof, has gripping end portions formed as engagement wings that, in an unloaded state, are inclined with respect to the washer element to engage and grip the upper side and the side wall of the profile element at the corner between upper side and the side wall. The inclined gripping end portions that grip the sidewalls of the profile element may ensure an even better fastening of the fastening unit to the profile element.

In a possible embodiment, substantially the entire support element is made of said vibration isolating material. Preferably, the support element is made in one piece that is entirely made of said vibration isolating material. The support element may for example be an injection-moulded part.

In a preferred embodiment, the support element comprises an upper portion that includes the first layer of vibration isolating material, said upper portion comprising an inlay area for the washer element, the inlay area being recessed with respect to a rim of the upper portion, a central body portion connecting the first layer of vibration isolating material and the second layer of vibration isolating material, the central body portion being sized to fit in the longitudinal slot of the profile element, and a lower portion that includes the second layer of vibration isolating material, said lower portion comprising a receiving pocket in which the oblong anchoring element is received.

BRIEF DESCRIPTION OF THE DRAWINGS

The invention will be further elucidated in the following detailed description with reference to the drawing, in which:

FIG. 3 schematically shows a front view of the fastening unit of FIG. 1 when it is inserted in a profile element; and FIG. 4 schematically shows a front view of a second embodiment of the fastening unit according to the invention.

DETAILED DESCRIPTION

Figure 1:
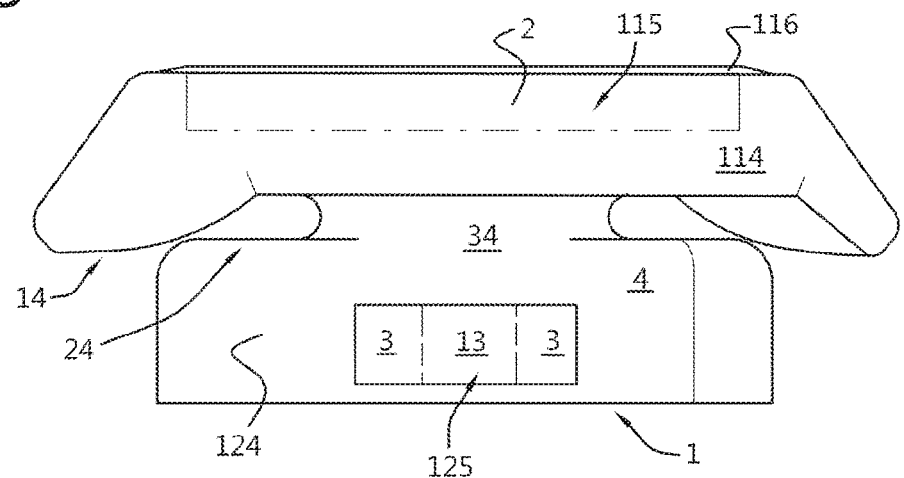
FIG. 1 schematically shows a front view of a first embodiment of the fastening unit according to the invention.

With reference to FIGS. 1-4, a fastening unit 1, 41 for fastening an object to a profile element 100 is shown. FIGS.

1, 2A, 2B and 2C show only the fastening unit 1 in a first embodiment thereof, respectively in a front view, two isometric views, and an exploded view, while FIG. 3 shows the fastening unit 1 mounted on a profile element 100 that is formed as a slotted channel body. FIG. 4 shows a second embodiment of the fastening unit 41.

With respect to FIG. 3, the profile element 100 comprises side walls 101, 102, extending in a longitudinal direction, a bottom 103 that connects the side walls 101, 102, and an upper side 106 that is formed by a pair of opposing flanges 104, 105. Each flange 104, 105 extends inwards with respect to a respective sidewall 101, 102. The flanges 104, 105 define between them a longitudinal slot 107. The profile element 100 may for example be an extrusion part, or may be formed by bending a metal sheet in the desired shape.

As shown, the flanges 104, 105 comprise inwardly extending portions that are arranged substantially parallel with the bottom 103 of the profile element 100, the inwardly extending portions extending from respective side walls 101, 102 of the profile element 100. In this embodiment, the profile element 100 is of the C-section type.

In a further embodiment not shown here, the flanges 104, 105 may comprise a bent portion, bent towards the bottom 103 of the profile element 100 with respect to the inwardly arranged portion of the flange 104, 105.

The profile element 100 as shown in FIG. 3 is a non-limiting exemplary embodiment of a profile element 100. Many other types and shapes of profile elements comprising flanges 104, 105 are known. A fastening unit falling within the scope of the invention can be designed to be suited for virtually all types and shapes of profile elements that comprise flanges.

With reference to FIGS. 1, 2, and 4, the fastening unit 1 comprises a washer element, here a metal washer element 2, an oblong anchoring element, here a metal oblong anchoring element 3, and a support element 4. FIGS. 1, 2, and 3 show a first embodiment of the fastening unit 1. FIG. 4 shows a second embodiment of the fastening unit 41. In the following description, like parts are indicated with like reference numerals. The washer element 2 is adapted to be placed on an upper side of the profile element. The oblong metal anchoring element 3 has a threaded bore 13 for cooperation with a threaded rod. The anchoring element 3 is spaced apart from the washer element 2 and is adapted to be placed inside the profile element, beyond the flanges 104, 105 thereof. The support element 4 interconnects the metal washer element 2 and the oblong metal anchoring element 3.

The support element 4 comprises a body of vibration isolating material including a first layer of vibration isolating material 14 arranged on an underside of the metal washer element 2 and a second layer of vibration isolating material 24 arranged on an upper side of the metal anchoring element 3. Preferably, the vibration isolating material is an elastomeric material, more preferably a rubber.

With reference to FIG. 3 mainly, the support element 4 comprises a central body portion 34 connecting the first layer of vibration isolating material 14 and the second layer of vibration isolating material 24, the central body portion 34 being sized to fit in the longitudinal slot 107 of the profile element 100.

The first layer of vibration isolating material 14 and the second layer of vibration isolating material 24 may be sized such that in a fastened state they engage at least a part of the flanges 104, 105 of the profile element 100, which is shown in FIG. 3. The first layer of vibration isolating material 14 engages an outer side 106 of the flanges 104, 105, while the second layer of vibration isolating material 24, being arranged inside the profile element 100, engages an inner side of the flanges 104, 105.

More specifically, the first layer of vibration isolating material 14 may be sized such that in a fastened state it engages an upper edge of the sidewalls 101, 102 of the profile element 100, e.g. by providing it, seen in a longitudinal direction thereof, with gripping end portions 15, 16 (cf. FIG. 3) formed as engagement wings that, in an unloaded state, are inclined with respect to the metal washer element 2 to engage and grip the upper side and the side wall 101, 102 of the profile element 100. In this embodiment, the support element 4 substantially grips around the profile element 100, providing a relatively large contact area between the layers of vibration isolating material 14, 24 and the flanges 104, 105 of the profile element 100.

As is best visible in FIGS. 1 and 3, the support element 4 may comprise a lower portion 124 that includes the second layer of vibration isolating material 24, said lower portion 124 comprising a receiving pocket 125 in which the oblong metal anchoring element 3 is received. As is visible, the oblong metal anchoring element 3 is surrounded by the lower portion 124 of vibration isolating material.

Figure 2A:
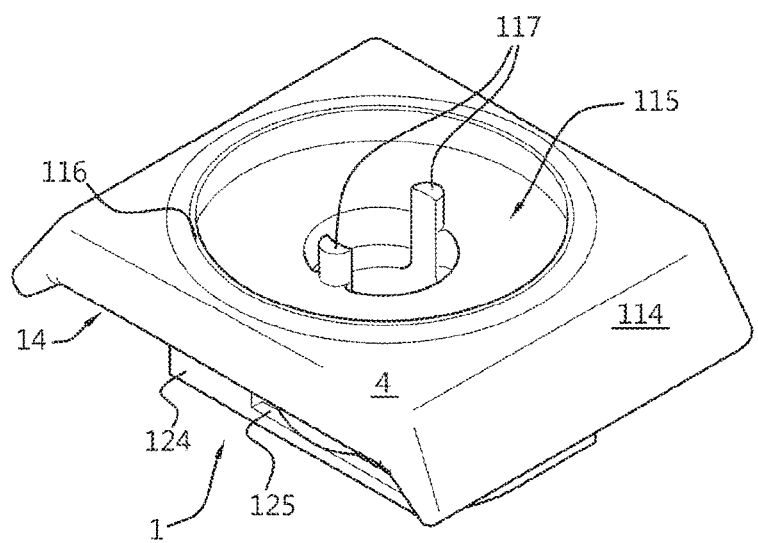
FIG. 2A schematically shows an isometric views of the fastening unit of FIG. 1 without a washer.

With reference to FIG. 2A, it is visible that the support element 4 may comprise an upper portion 114 that includes the first layer of vibration isolating material 14, said upper portion 114 comprising an inlay area 115 for the metal washer element, the inlay area 115 being recessed with respect to a rim 116 of the upper portion 114. Further visible in FIG. 2A are positioning protrusions 117, that position and hold the washer element when it is placed in the inlay area 115 of the upper portion 114.

In FIG. 2A, the metal washer element is omitted, to more clearly show the inlay area 115 and the positioning protrusions 117. Shown in FIG. 2B is the support element 4 of FIG. 2A, here with the metal washer element 2 placed in the inlay area 115.

Figure 2B:
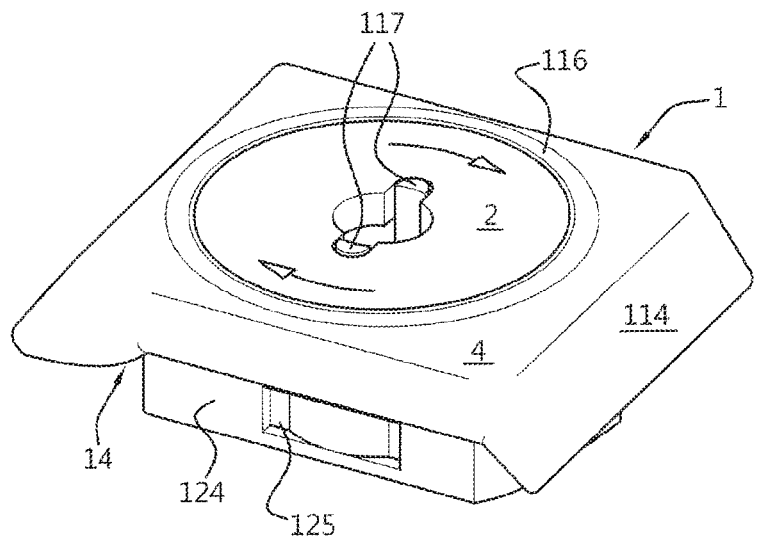
FIG. 2B schematically shows an isometric views of the fastening unit of FIG. 1.
Figure 2C:
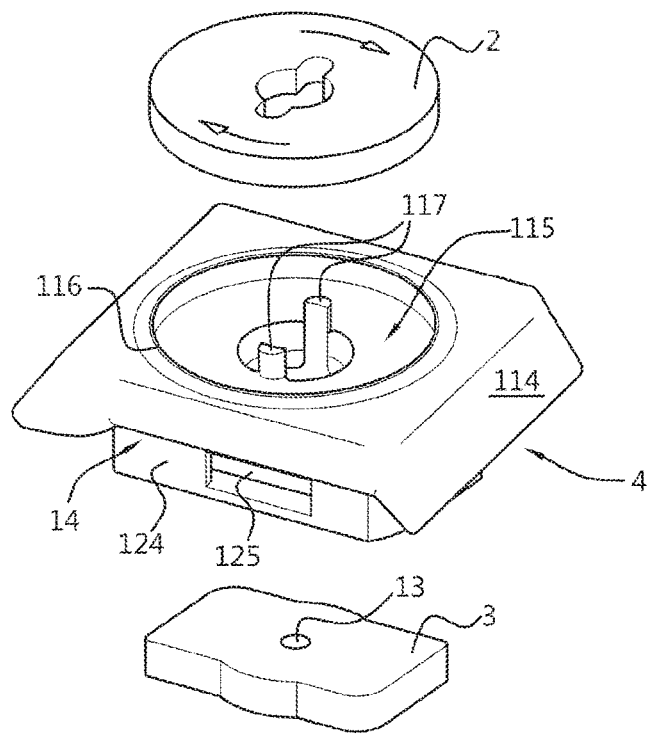
FIG. 2C schematically shows an exploded view of the fastening unit of FIG. 1.

FIG. 2C shows an exploded view of the support element 4, the metal washer element 2, and the oblong metal anchoring element 3 of FIGS. 2A and 2B.

Preferably, substantially the entire support element 4 is made of said vibration isolating material. More preferably, the support element 4 is made in one piece that is entirely made of said vibration isolating material. The support element 4 is preferably an injection-moulded part.

With reference to FIG. 3, the metal washer element 2 is adapted to be placed on the upper side 106 of the profile element 100, in a fastened state of the fastening unit 1. The metal washer element 2 provides rigidity for fastening an object, e.g. a pipe clamp or a pipe hanger, to the fastening unit 1. In embodiments a male fastening element, e.g. a threaded rod, extends away from the profile element 100, through the metal washer element 2. This male fastening element then allows an object to be fastened to the fastening unit 1, for example with tensioning means, e.g. by threading a nut onto the threaded rod.

The oblong metal anchoring element 3 and the second layer of vibration isolating material 24 each have a width that allows them, preferably in unity, to be aligned with the longitudinal slot 107 of the profiled section element 100, inserted therein, and then turned to receive the flanges 104, 105 of the profile element 100 between the first layer of vibration isolating material 14 and the second layer of vibration isolating material 24. In a fastened state of the fastening unit 1 the second layer of vibration isolating material 24 engages an inner side of the flanges 104, 105.

An accommodation space is defined between the oblong metal anchoring element 3 and the washer element 2, for the accommodation of the flanges 104, 105 of the profile element 100 in a fastened state of the fastening unit 1.

In FIG. 3, an inserted state is shown, where the oblong metal anchoring element 3 and the second layer of vibration isolating material 24 are inserted in the profile element 100. Here, an unfastened and unloaded state of the fastening unit 1 is shown, where the second layer of vibration isolating material 24 is spaced apart from the flanges 104, 105 of the profile element 100. This makes the different components in the Figure better visible. As will be understood, in a fastened state, the second layer of vibration isolating material 24 will be forced towards the inner side of the flanges 104, 105, clamping the flanges 104, 105 between the first layer of vibration isolating material 14 and the second layer of vibration isolating material 24. In such a fastened state, the first layer 14 and/or second layer 24 of vibration isolating material may substantially deform, although embodiments are conceived where the deformation is absent or substantially absent.

At least in said fastened state of the fastening unit 1, a barrier for vibrations is provided by the first layer of vibration isolating material 14 and the second layer of vibration isolating material 24 between the metal washer element 2 and the flanges 104, 105 of the profile element 100 and between the oblong metal anchoring element 3 and the flanges 104, 105 of the profile element 100.

The invention claimed is:

1. A fastening unit for fastening an object to a profile element,
   the profile element comprising:
   side walls extending in a longitudinal direction,
   a bottom that connects the side walls, and
   an upper side that is formed by a pair of opposing flanges, each flange extending inwards with respect to a respective sidewall, the flanges defining between them a longitudinal slot;
   the fastening unit comprising:
   a washer element, adapted to be placed on the upper side of the profile element,
   an oblong anchoring element having a threaded bore, the oblong anchoring element being spaced apart from the washer element, and adapted to be placed inside the profile element, beyond the flanges thereof, and
   a support element, interconnecting the washer element and the oblong anchoring element;
   wherein the support element comprises a first layer of vibration isolating material arranged on an underside of the washer element and a second layer of vibration isolating material arranged on an upper side of the anchoring element, and
   wherein the oblong anchoring element and the second layer of vibration isolating material each have a width that allows them to be aligned with the longitudinal slot of the profiled element, inserted therein, and then turned to receive the flanges of the profile element between the first layer of vibration isolating material and the second layer of vibration isolating material, so as to provide, at least in a fastened state of the fastening unit, a barrier for vibrations between the washer element and the flanges of the profile element and between the oblong anchoring element and the flanges of the profile element.

2. The fastening unit according to claim 1, wherein the vibration isolating material is an elastomeric material.

3. The fastening unit according to claim 2, wherein the elastomeric material is a rubber.

4. The fastening unit according to claim 1, wherein the support element comprises a central body portion connecting the first layer of vibration isolating material and the second layer of vibration isolating material, the central body portion being sized to fit through the longitudinal slot of the profile element.

5. The fastening unit according to claim 1, wherein the support element comprises a lower portion that includes the second layer of vibration isolating material, said lower portion comprising a receiving pocket in which the oblong anchoring element is received.

6. The fastening unit according to claim 1, wherein the support element comprises an upper portion that includes the first layer of vibration isolating material, said upper portion comprising an inlay area for the washer element, the inlay area being recessed with respect to a rim of the upper portion.

7. The fastening unit according to claim 1, wherein the first layer of vibration isolating material and the second layer of vibration isolating material are sized such that in the fastened state they engage at least a part of the flanges of the profile element.

8. The fastening unit according to claim 1, wherein the first layer of vibration isolating material is sized such that in the fastened state it engages an upper edge of the sidewalls of the profile element.

9. The fastening unit according to claim 1, wherein the first layer of vibration isolating material, seen in a longitudinal direction thereof, has gripping end portions formed as engagement wings that, in an unloaded state, are inclined with respect to the washer element to engage and grip the upper side and the side walls of the profile element.

10. The fastening unit according to claim 1, wherein substantially the entire support element is made of said vibration isolating material.

11. The fastening unit according to claim 1, wherein the support element is made in one piece that is made of said vibration isolating material.

12. The fastening unit according to claim 1, wherein the support element is an injection-moulded part.

* * * * *